Figure 1:
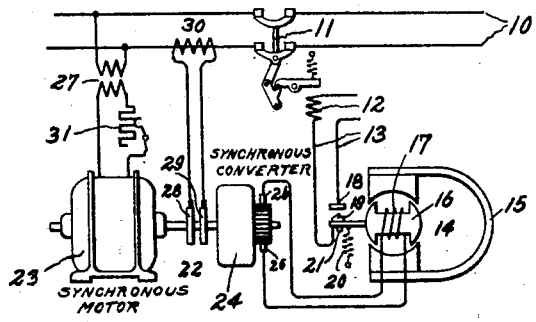

March 24, 1925.

O. C. TRAVER

PROTECTION OF ELECTRIC SYSTEMS

Filed June 16, 1924

1,530,962

Inventor:
Oliver C. Traver,
by His Attorney.

Patented Mar. 24, 1925.

1,530,962

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

PROTECTION OF ELECTRIC SYSTEMS.

Application filed June 16, 1924. Serial No. 720,408.

*To all whom it may concern:*

Be it known that I, OLIVER C. TRAVER, a citizen of the United States, residing at Schenectady, in the county of Schenectady, State of New York, have invented certain new and useful Improvements in the Protection of Electric Systems, of which the following is a specification.

My invention relates to improvements in the protection of alternating current electric systems and more particularly to improvements in protective devices which function in conformance with a predetermined current and the direction of power in an alternating current electric circuit and an object of my invention is to provide a protective device which has improved operating characteristics.

In relays of the dynamometer and induction types wherein operation is dependent upon the coaction of potential and current windings, the desired operation is often seriously affected by low potential and the phase relation of the potential and current. When the relays are to function in accordance with the direction of power in an alternating current electric circuit, a fault such as a short-circuit which may result in a change in the direction of the power, will cause the potential to drop to such a low value as to render the operation of the relays nearest the fault unreliable. Also, depending upon system connections particularly when the potential is taken on the low potential side of a power transformer connected in circuit with one of two normally synchronous sources, the low potential condition tends to permit the two sources to get out of synchronism. Consequently, the phase relation of the potential and current may vary over the entire range of 360 electrical degrees. Therefore, a power directional relay of the usual type may operate incorrectly. This difficulty is sometimes obviated by using high potential transformers but the cost of these is naturally high and is dependent on the potential of the circuit to be protected.

It is, therefore, an object of my invention to provide an improved protective device, the correct operation of which upon the occurrence of abnormal circuit conditions such as over-current and change in direction of power is substantially independent of the potential and the phase relation of the current and the potential of the circuit to be protected. A further object of my invention is to provide an improved protective device which does not inherently require expensive designs of potential transformers and the like.

My invention will be better understood from the following description taken in connection with the accompanying drawing and its scope will be pointed out in the appended claims.

Figure 2:
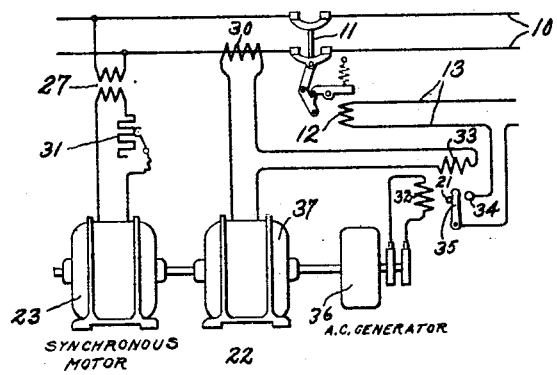

In the accompanying drawing Fig. 1 illustrates diagrammatically an embodiment of my invention and Fig. 2 illustrates diagrammatically a modification of my invention.

In Figs. 1 and 2, an alternating current electric circuit 10 to be protected upon the occurrence of abnormal circuit conditions is arranged to be controlled by a suitable circuit breaker 11, shown as of the latched-in type, the opening of which is arranged to be effected upon energization of a trip coil 12 connected in a trip circuit 13 which may be supplied from a suitable source, all in a manner well-known to the art.

Referring now to Fig. 1, the trip circuit 13 is arranged to be controlled by a suitable direct current directional relay 14 which may be of the dynamometer type. This relay is shown as comprising a definitely polarized portion such as a permanent magnet or field member 15 between the poles of which an armature 16 is pivotally mounted. The armature 16 is provided with an energizing winding 17 and is arranged to control relatively movable cooperating contacts 18 and 19 in the trip circuit 13, the contact 19 being mounted for movement by the armature. The armature 16 is biased to contact opening position by a spring 20 against a stop 21 and the winding 17 may be energized upon current therein in one direction to tend to move and hold the armature against the stop 21 and with current above a predetermined value in the opposite direction to move the armature to contact closing position against the bias of the spring 20.

For supplying an operating current to the energizing winding 17 of the relay 14, I provide a rotating apparatus indicated generally as 22 and arranged to be driven synchronously in response to either the potential or the current of the circuit 10 in accordance with the relative values of the potential and the current. This apparatus may comprise means such as a synchronous motor 23 responsive to the potential of the circuit 10 for normally driving the apparatus synchronously and means such as a dynamo-electric machine or synchronous converter 24 responsive to the current in the circuit 10 for driving the apparatus synchronously when the current is above a predetermined value independently of the direction of the power in the circuit. The energizing winding 17 of the relay 14 is connected to the direct current brushes 25 and 26 of the converter 24 and will therefore be energized in accordance with the output of the converter. The motor 23 is of the self-starting type and may be single or polyphase in accordance with the circuit 10 to be protected. The motor is of the type having a definitely polarized field comprising either a permanent magnet structure or one separately excited from a direct current source. The motor 23 may be connected in shunt relation with the circuit 10 either directly or through a potential transformer 27 or across the low potential winding of any power transformer which may be present. The converter 24 may be of the single or polyphase type with soft iron field pole pieces excited by the current in the armature or by a winding connected across the direct current brushes 25 and 26. The alternating current side or collector rings 28 and 29 of the converter are connected in series relation with the circuit 10 through a current transformer 30. The rotor or armature of the converter 24 may be mechanically direct connected or geared to the rotor of the motor 23.

With this arrangement, it is clear that so long as the potential of the circuit 10 is normal, the motor 23 will drive the converter 24 synchronously and the converter output will depend on the current in the secondary of the current transformer 30. If now a fault causing an excess or over-current condition on the circuit 10 should occur, the motor 23 by reason of the decrease in potential accompanying the over-current condition will no longer drive the converter synchronously but as the potential across the secondary of the current transformer 30 has increased by virtue of the increase in current, the converter 24 will continue to rotate synchronously without slipping a pole and the output on the direct current side thereof will be proportional to the current in the secondary of the current transformer. In other words, either the motor 23 or the converter 24 will predominate to maintain synchronous speed in accordance with the relation between the potential and the current of the circuit 10. Thus, even at normal potential if the current increases sufficiently, the converter may do the driving. Therefore, upon the occurrence of a definite relation between the potential and the current, the driving action to maintain synchronous speed will be transferred automatically from the motor 23 to the converter 24 the output of which will depend upon the current in the secondary of the current transformer 30. For example, the apparatus may be arranged to be driven by the motor 23 when the potential is above a predetermined value such as one-half normal and the current is below a predetermined value such as twice normal, but when the potential falls below its predetermined value and the current rises above its predetermined value, the converter 24 takes hold and drives the apparatus synchronously. In order to prevent the converter 24 from falling out of synchronism by reason of driving the motor 23 as a generator to feed into the fault, I provide a current limiting impedance 31 in circuit with the motor 22.

Consequently, the amount and direction of the current supplied to the relay winding 17 from the direct current side of the converter will depend upon the current in the secondary of the current transformer 30 and the direction of power in the circuit 10, since for a definite direction of power the rotating apparatus 22 will establish a definite polarity at the direct current brushes of the converter. Thus, for example, with the power in the circuit 10 in this definite direction the relay armature 16 will be held against the stop 21 irrespective of the intensity of the current in the circuit 10. If, however, a fault condition causing over-current on the circuit 10 results in a change in the direction of the power in the circuit 10, the polarities of the brushes 25 and 26 are reversed. Consequently the direction of the current in relay winding 17 is reversed and therefore the armature 16 will be moved to circuit closing position against the bias of spring 20 and the circuit breaker 11 tripped. Thus, when a fault results in an overcurrent condition with a change in the direction of power the relay 14 will be supplied from the converter with current in the right direction to effect operation of the relay. Inasmuch as the action of the relay when the fault occurs is not dependent upon the potential or the phase relation of the potential and the current of the circuit 10, a positive and definite action is assured.

Referring now to Fig. 2, the trip circuit 13 is arranged to be controlled by an alternating current relay which may be of the induction type well known to the art and which is shown as comprising energizing windings 32 and 33 arranged to control relatively movable cooperating contacts 34 and 35 in the trip circuit 13. The winding 33 is connected in series relation with the circuit 10 through the current transformer 30 and is, therefore, energized in accordance with the current and direction of power in this circuit.

For energizing the winding 32 substantially independently of the potential and the phase relation of the potential and the current of the circuit 10, I provide a dynamo-electric machine such as alternating current generator 36 arranged normally to be driven synchronously in response to the potential of the circuit 10 by a synchronous motor 23 which may be constructed as heretofore described, and to be driven synchronously by a motor 37 in response to the current in the circuit 10 when the potential decreases and the current increases. The motors 23 and 37 and the generator 36 may be mechanically direct connected or geared together. The motor 37 may be single or polyphase and has its armature in series relation with the circuit 10 through the current transformer 30. The motor will be arranged to run synchronously and may be an induction motor with salient poles and have a field of soft iron excited by armature reaction.

With this arrangement, it will be apparent, that in accordance with the potential and the current of the circuit 10, the motor 23 will drive the generator 36 synchronously and for power in the circuit 10 in a definite direction the output of the generator that is to say the current in relay winding 32 will be fixed definitely in phase relation to the current in relay winding 33. Upon the occurrence of a change in the relative values of the potential and the current in the circuit 10 such as a decrease in the potential and an increase in the current, the motor 37 will drive the generator 36 synchronously so that it will not slip a pole and change this phase relation. Thus, for example, with power in one direction in the circuit 10, the relay windings 32 and 33 will cooperate to hold the contact 35 against a stop 21. If, however, a fault condition on the circuit 10 results in a change in the direction of the power, then the phase relation of the currents in the windings 32 and 33 will be changed, since the current in relay winding 33 will be reversed relatively to the current in winding 32. Consequently, the windings 32 and 33 will cooperate to close the contacts 34 and 35 and thereby effect the opening of the circuit breaker 11.

With this arrangement, it is obvious that, although a fault such as over-current with a change in the direction of power be accompanied by a decrease in potential, this decrease does not impair the operation of the relay since the output of the generator 36 is substantially independent of the potential and the phase relation of the potential and the current of the circuit to be protected.

Although I have shown and described various embodiments of my invention, I do not desire to be limited to the exact arrangement shown and described but seek to cover in the appended claims all those modifications that fall within the true spirit and scope of my invention.

What I claim as new and desire to secure by Letters Patent of the United States, is:

1. In a protective system for an alternating current electric circuit, rotating apparatus comprising means responsive to the potential of the circuit for driving said apparatus synchronously, and means responsive to the current of the circuit for driving said apparatus synchronously, said potential responsive means normally being predominant to drive said apparatus synchronously and the one or the other of said means being adapted to drive said apparatus synchronously in accordance with the relative values of the potential and the current of the circuit.

2. In a protective system for an alternating current electric circuit, a relay and means for supplying an operating current to said relay to effect the operation thereof upon the occurrence of abnormal circuit conditions comprising a rotating apparatus arranged to be driven synchronously normally in response to the potential of the circuit and upon the occurrence of a predetermined current in response to the current of the circuit independently of the direction of the power in the circuit.

3. In a protective system for an alternating current electric circuit, rotating apparatus comprising means responsive to the potential of the circuit for driving said apparatus synchronously when the potential is above a predetermined value and means responsive to the current of the circuit for driving said apparatus synchronously when the potential of the circuit is less than said predetermined value and the current of the circuit exceeds a predetermined value.

4. A protective system for an alternating current electric circuit comprising a relay arranged to control the opening of the circuit and means for supplying an operating current to said relay to effect the operation thereof upon the occurrence of abnormal circuit conditions comprising a dynamo-electric machine connected in circuit with said relay and arranged to be driven synchronously normally in response to the potential of the circuit and in response to the current of the circuit when the potential decreases and the current is above a predetermined value.

5. A protective system for an alternating current electric circuit comprising a relay arranged to control the opening of the circuit and a rotating apparatus adapted to supply an operating current to said relay upon the occurrence of abnormal circuit conditions comprising means responsive to the potential of the circuit for driving said apparatus synchronously when the potential is above a predetermined value and the current is below a predetermined value and means responsive to the current of the circuit for driving said apparatus synchronously when the potential of the circuit is less than its said predetermined value and the current exceeds its said predetermined value.

6. A protective system for an alternating current electric circuit comprising a directional relay, means in circuit with said relay for supplying thereto a direct current substantially proportional to the current in the circuit and in a direction dependent upon the direction of power in the circuit comprising a synchronous converter connected in series relation with the circuit whereby to be driven synchronously in response to the current when the current is above a predetermined value, and a self-starting synchronous motor connected in shunt relation with the circuit and arranged normally to drive said converter synchronously in response to the potential value whereby with the alternating current power in a definite direction to establish a definite polarity at the direct current brushes of the converter.

7. A protective system for an alternating current electric circuit comprising a relay arranged to control the opening of the circuit, means in circuit with said relay for supplying thereto upon the occurrence of abnormal circuit conditions an operating current substantially proportional to the current in the circuit and in a direction dependent upon the direction of power in the circuit comprising a synchronous converter connected in series relation with the circuit whereby to be driven synchronously in response to the current when the current is above a predetermined value, and a synchronous motor connected in shunt relation with said circuit and arranged normally to drive said converter synchronously in response to the potential of the circuit whereby with the alternating current power in a definite direction to establish a definite polarity on the direct current brushes of the converter.

8. A protective system for an alternating current electric circuit comprising a directional relay and means in circuit with said relay for supplying thereto an operating current substantially proportional to the current in the circuit comprising a dynamo-electric machine arranged to be driven synchronously normally in response to the potential of the circuit and upon the occurrence of an abnormal circuit condition in response to the current in the circuit whereby to control the operation of said relay independently of the potential of the circuit upon the occurrence of the abnormal condition.

In witness whereof, I have hereunto set my hand this 13th day of June, 1924.

OLIVER C. TRAVER.